US012713175B2

(12) United States Patent
Ma et al.

(10) Patent No.: US 12,713,175 B2
(45) Date of Patent: Aug. 18, 2026

(54) EARPHONE AND EARPHONE ASSEMBLY

(71) Applicant: BEIJING XIAOMI MOBILE SOFTWARE CO., LTD., Beijing (CN)

(72) Inventors: Dong Ma, Beijing (CN); Mengyang Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 689 days.

(21) Appl. No.: 18/072,475

(22) Filed: Nov. 30, 2022

(65) Prior Publication Data

US 2024/0056721 A1 Feb. 15, 2024

(30) Foreign Application Priority Data

Aug. 11, 2022 (CN) ........................ 202210963569.2

(51) Int. Cl.
*H04R 1/10* (2026.01)
*H04R 1/28* (2006.01)

(52) U.S. Cl.
CPC ......... *H04R 1/1075* (2013.01); *H04R 1/1083* (2013.01); *H04R 1/2849* (2013.01)

(58) Field of Classification Search
CPC ... H04R 1/1075; H04R 1/1083; H04R 1/2849
USPC .......................................................... 381/150
See application file for complete search history.

(56) References Cited

U.S. PATENT DOCUMENTS

| | | | |
|---|---|---|---|
| 2011/0129107 A1 | 6/2011 | Andersen | |
| 2014/0307908 A1 | 10/2014 | Andersen | |
| 2022/0295187 A1 | 9/2022 | Lee et al. | |

FOREIGN PATENT DOCUMENTS

| | | |
|---|---|---|
| EP | 2 330 829 A1 | 6/2011 |
| EP | 4 013 065 A1 | 6/2022 |
| WO | WO 2022/048395 A1 | 3/2022 |

OTHER PUBLICATIONS

Wang et al., English translation, WO2023160114A1, ip.com, US filed Dec. 8, 2022, foreign priority filing Feb. 28, 2022 (Year: 2022).*
Wang et al., original WIPO in Chinese, WO2023160114A1, ip.com, US filed Dec. 8, 2022, foreign priority filing Feb. 28, 2022 (Year: 2022).*
Extended European Search Report issued Aug. 30, 2023 in European Application 22209257.9, 9 pages.

* cited by examiner

*Primary Examiner* — Vivian C Chin
(74) *Attorney, Agent, or Firm* — Oblon, McClelland, Maier & Neustadt, L.L.P.

(57) ABSTRACT

The present disclosure provides an earphone and an earphone assembly. The earphone includes a housing, a bracket inside the housing, and a sound unit inside the housing. The housing has a first hole and a second hole. The bracket has a channel. The channel includes a slot section and a hole section. The section includes an opening, a first port and a second port. An inner wall of the housing blocks the opening, the first port is in connection with the first hole, and the second port is in connection with the second hole. The hole section has a first end in connection with the slot section and a second end in connection with the sound unit. The bracket is between the housing and the sound unit.

17 Claims, 6 Drawing Sheets

EARPHONE AND EARPHONE ASSEMBLY

CROSS-REFERENCE TO RELATED APPLICATIONS

This application is based on and claims priority to Chinese Patent Application No. 202210963569.2 filed on Aug. 11, 2022, the entire contents of which are incorporated herein by reference for all purposes.

BACKGROUND

TWS technology (True Wireless Stereo) is a technology based on the development of Bluetooth chips, and plays an important role in wireless connection, voice interaction, intelligent noise cancellation, health monitoring, hearing enhancement/protection and other fields. At present, the technology of TWS-based true wireless stereo earphones is relatively mature, and some mobile phone manufacturers are gradually making true wireless stereo earphones as a standard configuration of high-end mobile phones.

However, a large size specification of true wireless stereo earphones in the related art diminishes the appearance and refinement of the earphones and hinders the lightweight of the earphones, which may degrade user experience.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

The present disclosure relates to the field of audio playing technology, and more particularly, to an earphone and an earphone assembly using the same.

An earphone according to a first aspect of the present disclosure includes: a housing including a first hole and a second hole; a bracket inside the housing, the bracket including a channel, and the channel including a slot section and a hole section; a sound unit inside the housing. The slot section includes: an opening blocked by an inner wall of the housing, a first port in connection with the first hole, and a second port in connection with the second hole. A first end of the hole section is in connection with the slot section, and a second end of the hole section is in connection with the sound unit. The bracket is between the housing and the sound unit.

An earphone assembly according to a second aspect of the present disclosure includes an earphone. The earphone includes a housing including a first hole and a second hole; a bracket inside the housing, the bracket including a channel, and the channel including a slot section and a hole section; a sound unit inside the housing. The slot section includes: an opening blocked by an inner wall of the housing, a first port in connection with the first hole, and a second port in connection with the second hole. A first end of the hole section is in connection with the slot section, and a second end of the hole section is in connection with the sound unit. The bracket is between the housing and the sound unit.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

The present disclosure is based on the inventors' findings and understanding of the following facts and problems.

In the related art, in order to reduce wind noise, a true wireless stereo earphone is designed with a wind noise conducting tube at a handle of the earphone, and the wind noise conducting tube is usually open on both sides. During use, airflow enters the wind noise conducting tube from one end and exits through the other end; sound waves are transmitted to a microphone through a port on another side of the wind noise conducting tube. Consequently, the influence of the airflows on the sound waves can be reduced.

However, in the related art, in order to adapt to the design of the wind noise conducting tube and satisfy a requirement for providing holes, a part of a housing of the handle of the earphone needs to be thick, which increases an overall size of the handle, diminish the appearance of the earphone, and is not conducive to the lightweight of the earphone.

The present disclosure aims to solve one of the technical problems in related art at least to some extent.

Therefore, aspects of the present disclosure provide an earphone that has a small size specification, realizes lightness, improves the aesthetics and refinement, and further upgrades the user experience.

Aspects of the present disclosure also provide an earphone assembly using the earphone.

Aspects of the present disclosure will be described in detail below, and examples of the aspects are shown in the accompanying drawings. The aspects described below with reference to the drawings are exemplary and are intended to explain the present disclosure rather than limit the present disclosure.

As shown in FIGS. 1 to 6, an earphone according to aspects of the present disclosure includes a housing 1, a bracket 2, and a sound unit 3.

Figure 1:
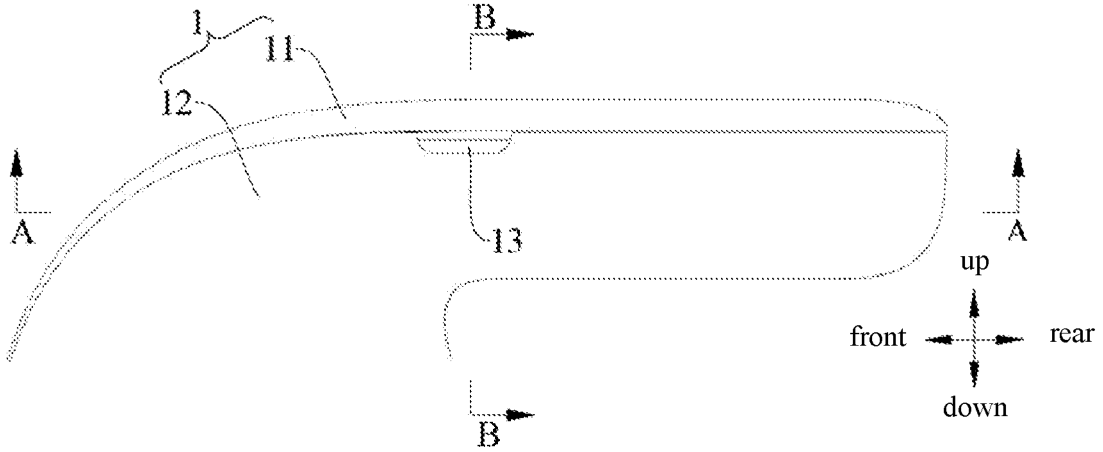
FIG. 1 is a left view of an earphone according to an aspect of the present disclosure.
Figure 3:
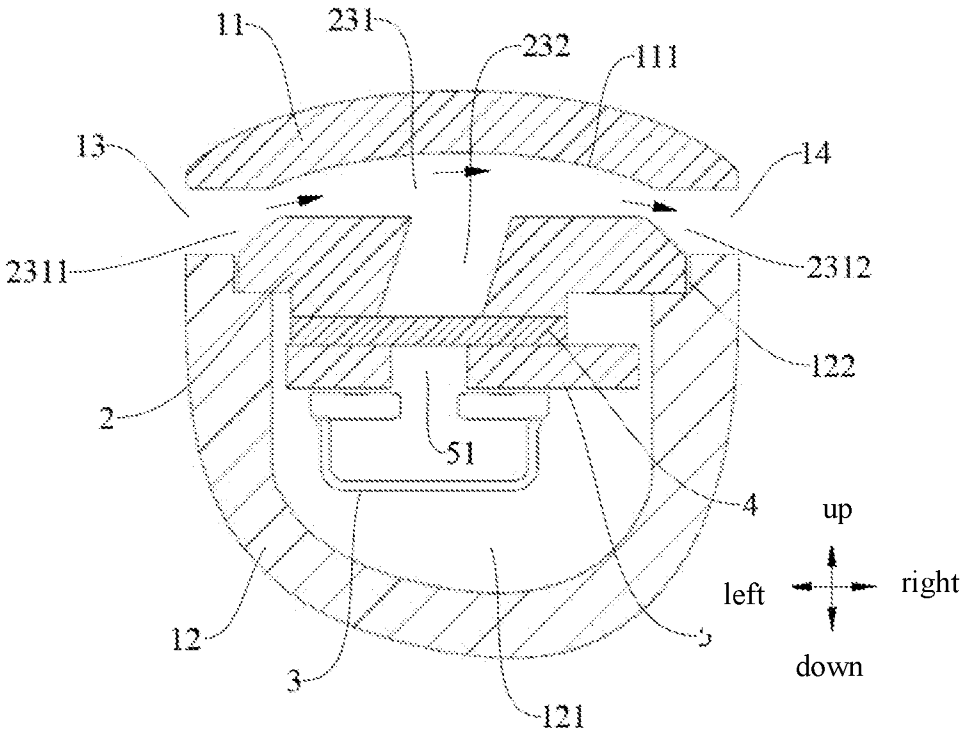
FIG. 3 is a sectional view along line B-B of the earphone in FIG. 1.

The housing 1 includes a first hole 13 and a second hole 14. As shown in FIG. 1 and FIG. 3, the housing 1 is integrally formed. For example, the housing 1 is made of plastics, and the housing 1 may be integrally formed by injection molding. The first hole 13 and the second hole 14 are arranged oppositely. For example, the first hole 13 is on a left side of the housing 1 and penetrates a left wall of the housing 1, and the second hole 14 is on a right side of the housing 1 and penetrates a right wall of the housing 1.

It can be understood that, in other aspects, the housing 1 has a split structure. That is, the housing 1 includes more than two housing parts, and the housing parts are spliced together to form a complete housing 1.

The bracket 2 is inside the housing 1, and the bracket 2 includes a channel 23. The channel 23 includes a slot section 231 and a hole section 232. The slot section 231 has an opening, a first port 2311 and a second port 2312. An inner wall of the housing 1 blocks the opening; the first port 2311 is in connection with the first hole 13; the second port 2312 is in connection with the second hole 14; and a first end of the hole section 232 is in connection with the slot section 231.

For example, the bracket 2 is fixed inside the housing 1, and the bracket 2 is used to mount and secure a LDS antenna. The channel 23 is substantially divided into two parts, namely, the slot section 231 and the hole section 232, and the slot section 231 and the hole section 232 are substantially arranged in a T shape. The slot section 231 is above the hole section 232, and the slot section 231 substantially runs through the bracket 2 in a left-right direction. The hole section 232 substantially extends in an up-down direction and runs through the bracket 2, and a top end of the hole section 232 is in connection with the slot section 231.

The opening of the slot section 231 faces upwards, and after the bracket 2 is fixed inside the housing 1, the opening of the slot section 231 is sealed by the inner wall of the housing 1. The first port 2311 is a left port of the slot section 231, and the first port 2311 is in connection with the first hole 13. The second port 2312 is a right port of the slot section 231, and the second port 2312 is in connection with the second hole 14.

Figure 2:
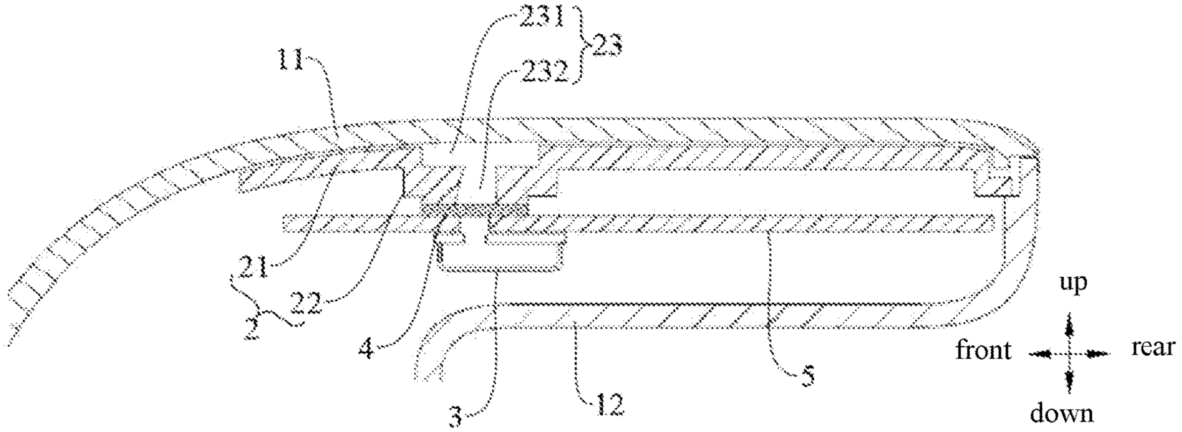
FIG. 2 is a sectional view along line A-A of the earphone in FIG. 1.

The sound unit 3 is inside the housing 1, and the sound unit 3 is in connection with a second end of the hole section 232. The bracket 2 is between the housing 1 and the sound unit 3. As shown in FIG. 2 and FIG. 3, the sound unit 3 is a receiver, and the sound unit 3 is mounted inside the housing 1 and below an antenna unit.

During use, as shown in FIG. 3, airflow enters the slot section 231 from the first hole 13 and the first port 2311, then flows along the slot section 231, and exits the housing 1 through the second port 2312 and the second hole 14. Sound waves in the slot section 231 are transmitted to the receiver from the hole section 232. As a result, wind noise can be reduced and quality of phone communication can be improved.

In some aspects, the earphone includes a handle, and the channel 23 of the bracket 2 is in an interior of the handle.

For the earphone according to the aspects of the present disclosure, since the channel 23 is within the bracket 2, a situation that the housing 1 in the related art needs to be thickened to satisfy design requirements of the channel 23 due to the arrangement of the channel 23 in an interior of the housing can be avoided, preventing the channel 23 from influencing the thickness of the housing 1, realizing a lightweight and thin design of the housing 1, and improving an overall space utilization rate. Hence, an overall size specification of the earphone is reduced, the lightness and refinement of the earphone is enhanced, and the user experience is upgraded.

In addition, the opening of the slot section 231 is blocked by the inner wall of the housing 1, that is, the channel 23 is sealed by the splicing of the housing 1 and the bracket 2. Consequently, a situation that the arrangement of the slot section 231 within the bracket 2 thickens the bracket 2 can be avoided, the thickness of the bracket 2 can be further reduced, and the space utilization rate can be improved.

In some aspects, the bracket 2 includes a bracket body 21 and a sunken portion 22. The slot section 231 is within the bracket body 21. The sunken portion 22 is on a side of the bracket body 21, and a part of a surface of the sunken portion 22 forms a bottom surface of the slot section 231. The hole section 232 is within the sunken portion 22 and runs through the sunken portion 22 along a thickness direction of the sunken portion 22.

For example, as shown in FIG. 2, the bracket body 21 is plate-like, and the sunken portion 22 is integrally formed with the bracket body 21. An upper surface of the bracket body 21 is used to abut against the inner wall of the housing 1, and the sunken portion 22 is on a lower surface of the bracket body 21. The bracket body 21 includes two parts, namely a front part and a rear part, which are spaced apart in a front-rear direction, and the slot section 231 is formed between the front part and the rear part.

The sunken portion 22 is coupled between the two parts of the bracket body 21. That is, a front side of the sunken portion 22 is coupled to the front part of the bracket body 21, a rear side of the sunken portion 22 is coupled to the rear part of the bracket body 21, and the sunken portion 22 is directly opposite to an interval between the front part and the rear part in the up-down direction. A part of an upper surface of the sunken portion 22 forms the bottom surface of the slot section 231. The hole section 232 is within the sunken portion 22, and the hole section 232 runs through the sunken portion 22 in the up-down direction.

Consequently, the bracket 2 only needs to be sunk locally, which facilitates the arrangement of the slot section 231 and the hole section 232, reduces the influence of the channel 23 on the bracket 2, and further improves the space utilization rate of the housing 1.

In some aspects, the housing 1 includes a first casing 11 and a second casing 12. The second casing 12 includes a first groove and a second groove, each of which penetrates a wall of the second casing 12. An opening of the first groove is blocked by the first casing 11 to form the first hole 13, and an opening of the second groove is blocked by the first casing 11 to form the second hole 14.

As shown in FIGS. 1-3, the housing 1 has a split structure and includes two parts, which are the first casing 11 and the second casing 12. An opening of the first casing 11 faces downward and an opening of the second casing 12 faces upward. The first casing 11 is mounted above the second casing 12. A butt joint of the first casing 11 and the second casing 12 can be sealed to ensure the sealing of an inner cavity of the housing 1.

The first groove and the second groove are both in the second casing 12 and at an edge of the opening of the second casing 12. The first groove is on a left side of the second casing 12, and the second groove is on a right side of the second casing 12. When the first casing 11 and the second casing 12 are assembled, the first casing 11 blocks the opening of the first groove and the opening of the second groove. In such a way, the arrangement of the first hole 13 and the second hole 14 is facilitated, and a situation that the first casing 11 needs to be partially or completely thickened when the holes are in the first casing 11 can be avoided, which is conducive to realizing the lightness and thinness of the first casing 11.

In some aspects, the first casing 11 is hermetically coupled to the bracket 2 to seal the slot section 231; the bracket 2 is hermetically coupled to the second casing 12 to define a mounting cavity 121 in the second casing 12; and the sound unit 3 is in the mounting cavity 121.

For example, a sealing process is performed between the first casing 11 and the bracket 2, and a sealing method includes sealant bonding, seal members and so on. Therefore, a sealed part between the first casing 11 and the bracket 2 is formed on a peripheral side of the slot section 231, and the sealing of the slot section 231 can be ensured.

A part where the bracket 2 is in contact with the second casing 12 needs to be sealed, and a sealing method may also include sealant bonding, seal members and so on. Consequently, as shown in FIG. 3 and FIG. 4, the bracket 2 and the second casing 12 enclose a relatively sealed mounting cavity 121, providing sealing protection for the sound unit 3 and other components in the mounting cavity 121, and improving the waterproof performance of the earphone.

In some aspects, the earphone includes a first adhesive path 6. The second casing 12 includes a mounting groove 122 at the opening thereof, and the mounting groove 122 is on an outer peripheral side of the opening of the second casing 12 and extends along a peripheral direction of the opening. An outer peripheral edge of the bracket 2 is fitted in the mounting groove 122, and the bracket 2 is bonded and sealed with at least a part of a wall surface of the mounting groove 122 through the first adhesive path 6.

Figure 4:
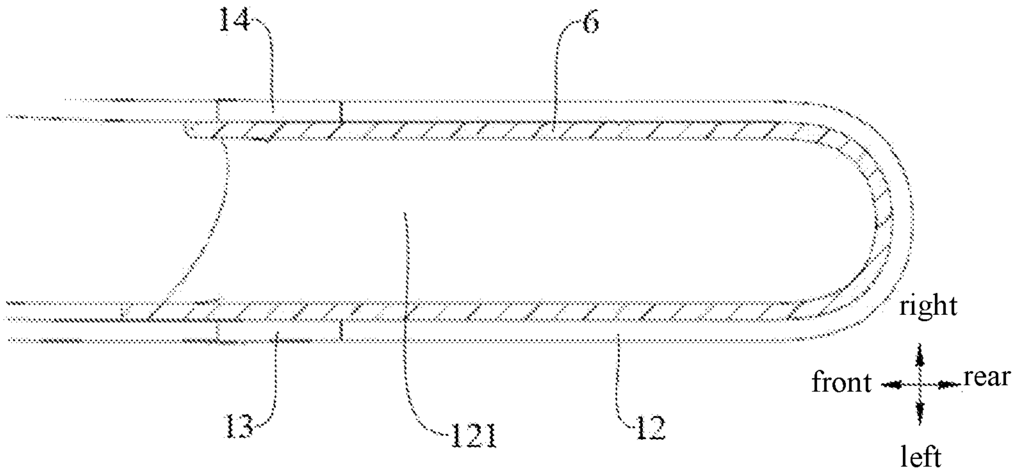
FIG. 4 is a schematic view illustrating arrangement of a first adhesive path according to an aspect of the present disclosure.

As shown in FIG. 3 and FIG. 4, the second casing 12 has an open top; the mounting groove 122 is in the top of the second casing 12 and inside the second casing 12; and the mounting groove 122 extends along the edge of the opening of the second casing 12. The first adhesive path 6 is an application path of an adhesive, a sealant, or glue dispensing. The mounting groove 122 includes a tread surface and an elevation surface, in which the tread surface is substantially horizontal and the elevation surface is substantially vertical. The first adhesive path 6 may be applied only to the tread surface of the mounting groove 122.

During the installation of the bracket 2, the peripheral edge of the bracket 2 can be lapped onto the tread surface of the mounting groove 122, and the bracket 2 and the tread surface of the mounting groove 122 are sealingly bonded and fixed by the first adhesive path 6. Consequently, the sealing of connection between the bracket 2 and the second casing 12 is ensured.

It can be understood that, when the housing 1 is integrally formed, the mounting groove 122 is a groove in the inner wall of the housing 1, and the groove substantially extends along a peripheral direction of the housing 1. At this time, the peripheral edge of the bracket 2 is directly embedded in the mounting groove 122.

In some aspects, the earphone includes a second adhesive path 7 and a third adhesive path 8. The second adhesive path 7 at least partially extends along a first side edge of the opening of the slot section 231, and the third adhesive path 8 at least partially extends along a second side edge of the opening of the slot section 231. The first casing 11 is bonded and sealed with the bracket 2 through the second adhesive path 7 and the third adhesive path 8.

Figure 5:
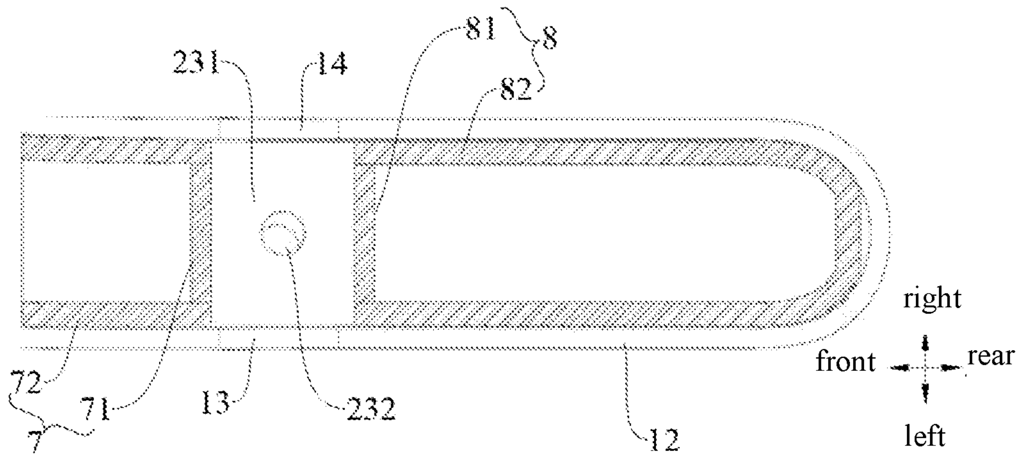
FIG. 5 is a schematic view illustrating arrangement of second and third adhesive paths according to an aspect of the present disclosure.
Figure 6:
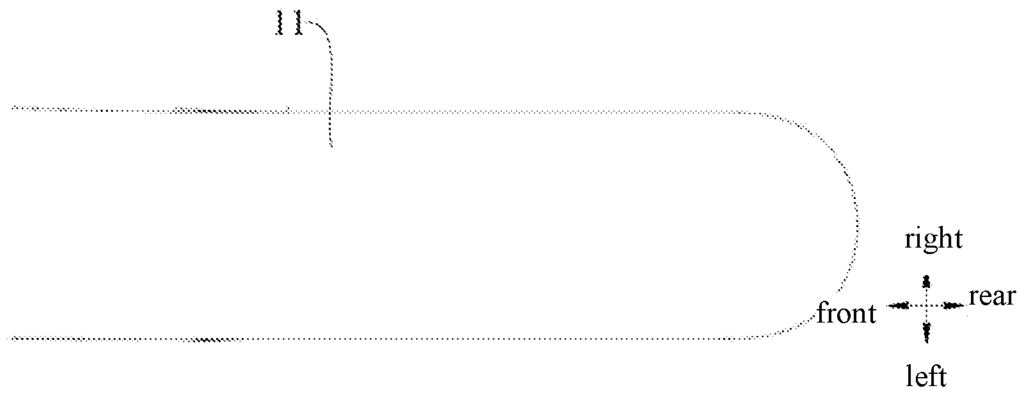
FIG. 6 is a top view of an earphone according to an aspect of the present disclosure.

For example, the second adhesive path 7 and the third adhesive path 8 may also be regarded as application paths of adhesives such as viscose and sealants. Both the second adhesive path 7 and the third adhesive path 8 are on an upper surface of the bracket 2. As shown in FIG. 5 and FIG. 6, the first casing 11 is a decorative casing, and the first casing 11 is fixed to an upper side of the bracket 2 through the second adhesive path 7 and the third adhesive path 8.

The second adhesive path 7 is on a front side of the slot section 231, and the third adhesive path 8 is on a rear side of the slot section 231. A front side of the opening of the slot section 231 can be sealed through the second adhesive path 7, and a rear side of the opening of the slot section 231 can be sealed through the third adhesive path 8, ensuring the sealing of the slot section 231.

It can be understood that, in other aspects, when the housing 1 is integrally formed, the second adhesive path 7 and the third adhesive path 8 are directly bonded between the inner wall of the housing 1 and the bracket 2.

Therefore, the earphone according to the aspects of the present disclosure can form a plurality of waterproof structures through the first adhesive path 6, the second adhesive path 7 and the third adhesive path 8, and the channel 23 is in a space enclosed by the plurality of waterproof structures, ensuring the sealing of the channel 23, and improving the waterproofness of the earphone; moreover, a situation that sound waves are transmitted into the housing 1 from a gap can be avoided, guaranteeing the quality of communication.

In some aspects, the second adhesive path 7 includes a first section 71 and a second section 72. The first section 71 extends along the first side edge of the opening of the slot section 231, and the second section 72 extends along the outer peripheral edge of the bracket 2 on a first side of the slot section 231.

For example, as shown in FIG. 5, the first section 71 extends along an edge of a front opening of the slot section 231; the second section 72 is U-shaped, and the second section 72 extends along the edge of the bracket 2 on the front side of the slot section 231; a first end of the second section 72 is coupled to a first end of the first section 71, and a second end of the second section 72 is coupled to a second end of the first section 71.

As a result, the second adhesive path 7 encloses a relatively sealed area on the front side of the slot section 231, to provide the sealing protection for components in the second adhesive path 7.

In some aspects, the third adhesive path 8 includes a third section 81 and a fourth section 82, which form a closed loop. The third section 81 extends along the second side edge of the opening of the slot section 231, and the fourth section 82 extends along the outer peripheral edge of the bracket 2 on a second side of the slot section 231.

For example, as shown in FIG. 5, the third section 81 extends along an edge of a rear opening of the slot section 231; the fourth section 82 is U-shaped, and the fourth section 82 extends along the edge of the bracket 2 on the rear side of the slot section 231; a first end of the fourth section 82 is coupled to a first end of the third section 81, and a second end of the fourth section 82 is coupled to a second end of the third section 81.

As a result, the third adhesive path 8 encloses a relatively sealed area on the rear side of the slot section 231, to provide the sealing protection for components in the third adhesive path 8.

It should be noted that the first adhesive path 6 forms one layer of sealing protection, and the second adhesive path 7 and the third adhesive path 8 form another layer of sealing protection. The two layers of sealing protection can completely isolate the channel 23 from an inner space of the earphone, ensuring the airtight and waterproof sealing of the earphone.

In some aspects, the first casing 11 includes a curved surface 111, at least a part of the curved surface 111 is opposite to the opening of the slot section 231, and a side of the curved surface 111 facing away from the bracket 2 protrudes and is configured to guide air in the slot section 231 to flow against an wall of the slot section.

As shown in FIG. 3, the entire first casing 11 has an arc plate shape, the curved surface 111 is on a lower surface of the first casing 11, and the curved surface 111 protrudes upward. After the first casing 11 and the bracket 2 are fixed, the curved surface 111 seals the opening of the slot section 231. After the airflow enters the slot section 231, the airflow has a Coanda effect under the action of the curved surface 111, and flows along a wall of the curved surface 111, achieving an effect of guiding the airflow and facilitating the discharge of the airflow out of the housing 1.

In some aspects, the earphone includes a filter screen 4 between the bracket 2 and the sound unit 3 and opposite to the hole section 232, and the filter screen 4 is configured to filter out impurities and reduce noise.

The filter screen 4 is a dustproof screen. As shown in FIG. 2, the filter screen 4 is fixed on a lower side of the bracket 2, and the filter screen 4 can block a lower orifice of the hole section 232. When in use, the filter screen 4 can filter out impurities such as dust, and can divide the airflow and reduce disturbance of the airflow, which can further lower the wind noise.

In some aspects, the earphone includes a circuit board 5 between the filter screen 4 and the sound unit 3, and the circuit board 5 includes a connection hole 51 connected between the hole section 232 and the sound unit 3.

For example, as shown in FIG. 2 and FIG. 3, the circuit board 5 is a main board, the circuit board 5 is fixed under the filter screen 4, and the sound unit 3 is fixed under the circuit board 5. A sealing process may be performed between the circuit board 5 and the filter screen 4, and a sealing process may be performed between the circuit board 5 and the sound unit 3. The connection hole 51 runs through the circuit board 5 in the up-down direction and is opposite to the hole section 232 in the up-down direction, and the sound unit 3 is under the connection hole 51. Thus, the electrical connection between the sound unit 3 and the circuit board 5 is facilitated.

In some aspects, the sound unit 3 is an acoustic receiving unit or an acoustic emission unit. For example, the sound unit 3 is a receiver, or the sound unit 3 is a speaker (a microphone).

An earphone assembly according to aspects of the present disclosure will be described below.

The earphone assembly according to aspects of the present disclosure includes an earphone that may be the earphone described in the above aspects. The earphone assembly includes an earphone box in which at least a part of the earphone is fitted. For example, the earphone box includes a slot, and the earphone is fitted in the slot. In some aspects, the earphone box also has a charging function.

In the specification, it should be understood that, terms such as “central,” “longitudinal,” “transverse,” “length,” “width,” “thickness,” “upper,” “lower,” “front,” “rear,” “left,” “right,” “vertical,” “horizontal,” “top,” “bottom,” “inner,” “outer,” “clockwise,” “counterclockwise,” “axial,” “radial,” and “circumferential” should be construed to refer to the orientation as then described or as shown in the drawings under discussion. These relative terms are for convenience of description and do not indicate or imply that the device or element referred to must have a particular orientation or be constructed and operated in a particular orientation. Therefore, these terms should not be construed as limiting the present disclosure.

In addition, terms such as “first” and “second” are used herein for purposes of description and are not intended to indicate or imply relative importance or significance or the number of the features. Therefore, the features defined with “first” and “second” may explicitly or implicitly include one or more of this feature. In the description of the present disclosure, the term “a plurality of” means at least two, such as two or three, unless otherwise specifically defined.

In the present disclosure, unless specified or limited otherwise, the terms “mounted,” “connected,” “coupled,” “fixed” and the like are used broadly, and may be, for example, fixed connections, detachable connections, or integral connections; may also be mechanical or electrical connections; may also communicate with each other; may also be direct connections or indirect connections via intervening structures; may also be inner connection or mutual interaction of two elements, which can be understood by those skilled in the art according to specific situations.

In the present disclosure, unless otherwise specified and limited, a structure in which a first feature is “on” or “below” a second feature may include an aspect in which the first feature is in direct contact with the second feature, and may also include an aspect in which the first feature and the second feature are not in direct contact with each other, but are contacted via an additional feature formed therebetween. Furthermore, a first feature “on,” “above,” or “on top of” a second feature may include an aspect in which the first feature is right or obliquely “on,” “above,” or “on top of” the second feature, or just means that the first feature is at a height higher than that of the second feature; while a first feature “below,” “under,” or “on bottom of” a second feature may include an aspect in which the first feature is right or obliquely “below,” “under,” or “on bottom of” the second feature, or just means that the first feature is at a height lower than that of the second feature.

Reference throughout this specification to “an aspect,” “some aspects,” “an example,” “a specific example,” or “some examples,” means that a particular feature, structure, material, or characteristic described in connection with the aspect or example is included in at least one aspect or example of the present disclosure. Thus, the appearances of the phrases in various places throughout this specification are not necessarily referring to the same aspect or example of the present disclosure. Furthermore, the particular features, structures, materials, or characteristics may be combined in any suitable manner in one or more aspects or examples. In addition, those skilled in the art can combine different aspects or examples and features of different aspects or examples described in this specification without contradicting each other.

Although some aspects have been shown and described, the above aspects are illustrative and should not be construed as limitations on the present disclosure. It would be appreciated by those skilled in the art that changes, modifications, alternatives and variations can be made in the aspects without departing from the scope of the present disclosure.

What is claimed is:

1. An earphone comprising:

a housing comprising a first hole and a second hole;

a bracket inside the housing, the bracket comprising a channel, and the channel comprising a slot section and a hole section; and a sound unit inside the housing, wherein:

the slot section comprises an opening blocked by an inner wall of the housing, a first port in connection with the first hole, and a second port in connection with the second hole;

a first end of the hole section is in connection with the slot section, and a second end of the hole section is in connection with the sound; and the bracket is between the housing and the sound unit, wherein the bracket comprises:

a bracket body, the slot section being in an interior of the bracket body; and a sunken portion on a side of the bracket body, a part of a surface of the sunken portion forming a bottom surface of the slot section, and the hole section being in an interior of the sunken portion and running through the sunken portion along a thickness direction of the sunken portion, and wherein:

the housing comprises a first casing and a second casing;

the second casing comprises a first groove and a second groove, each of which penetrates a wall of the second casing; and an opening of the first groove is blocked by the first casing to form the first hole, and an opening of the second groove is blocked by the first casing to form the second hole.

2. The earphone according to claim 1, wherein the first casing is hermetically coupled to the bracket to seal the slot section, the bracket is hermetically coupled to the second casing to define a mounting cavity in the second casing, and the sound unit is inside the mounting cavity.

3. The earphone according to claim 1, further comprising a first adhesive path, wherein:

the inner wall of the housing comprises a mounting groove extending along a peripheral direction of the housing;

an outer peripheral edge of the bracket is fitted in the mounting groove; and the bracket is bonded and sealed with at least a part of a wall surface of the mounting groove through the first adhesive path.

4. The earphone according to claim 1, wherein:

the earphone comprises a second adhesive path and a third adhesive path;

the second adhesive path at least partially extends along a first side edge of the opening of the slot section, and the third adhesive path at least partially extends along a second side edge of the opening of the slot section; and the inner wall of the housing is bonded and sealed with the bracket through the second adhesive path and the third adhesive path.

5. The earphone according to claim 4, wherein:

the second adhesive path comprises a first section and a second section, the first section extends along the first side edge of the opening of the slot section, and the second section extends along an outer peripheral edge of the bracket on a first side of the slot section.

6. The earphone according to claim 4, wherein:

the third adhesive path comprises a third section and a fourth section, the third section and the fourth section form a closed loop, the third section extends along the second side edge of the opening of the slot section, and the fourth section extends along the outer peripheral edge of the bracket on a second side of the slot section.

7. The earphone according to claim 1, wherein the first casing comprises a curved surface, at least a part of the curved surface is opposite to the opening of the slot section, and a side of the curved surface facing away from the bracket protrudes and is configured to guide air in the slot section to flow against a wall of the slot section.

8. The earphone according to claim 1, further comprising a filter screen between the bracket and the sound unit and opposite to the hole section, wherein the filter screen is configured to filter out impurities and reduce noise.

9. The earphone according to claim 8, further comprising a circuit board between the filter screen and the sound unit, wherein the circuit board comprises a connection hole connected between the hole section and the sound unit.

10. The earphone according to claim 1, wherein the sound unit is an acoustic receiving unit or an acoustic emission unit.

11. The earphone according to claim 1, wherein:

the slot section and the hole section exhibit a T shape, and the slot section is above the hole section;

the slot section runs through the bracket in a left-right direction; and the hole section extends in an up-down direction and runs through the bracket, and a top end of the hole section is in connection with the slot section.

12. The earphone according to claim 1, wherein:

the bracket body is plate-like, and the sunken portion is integrally formed with the bracket body; and an upper surface of the bracket body abuts against the inner wall of the housing, and the sunken portion is on a lower surface of the bracket body.

13. The earphone according to claim 1, wherein:

the bracket body comprises two parts spaced apart in a front-rear direction, and the slot section is formed between the front part and the rear part; and the sunken portion is coupled between the two parts of the bracket body.

14. The earphone according to claim 3, wherein:

the mounting groove comprises a tread surface and an elevation surface, the tread surface is horizontal and the elevation surface is vertical; and the first adhesive path is applied to the tread surface of the mounting groove.

15. The earphone according to claim 3, wherein the first adhesive path is an application path of an adhesive, a sealant, or glue dispensing.

16. An earphone assembly, comprising an earphone, wherein the earphone comprises:

a housing comprising a first hole and a second hole;

a bracket inside the housing, the bracket comprising a channel, and the channel comprising a slot section and a hole section; and a sound unit inside the housing, wherein:

the slot section comprises: an opening blocked by an inner wall of the housing, a first port in connection with the first hole, and a second port in connection with the second hole;

a first end of the hole section is in connection with the slot section, and a second end of the hole section is in connection with the sound unit;

the bracket is between the housing and the sound unit;

the earphone further comprises a first adhesive path;

the inner wall of the housing comprises a mounting groove extending along a peripheral direction of the housing;

an outer peripheral edge of the bracket is fitted in the mounting groove; and the bracket is bonded and sealed with at least a part of a wall surface of the mounting groove through the first adhesive path.

17. The earphone assembly according to claim 16, further comprising an earphone box in which at least a part of the earphone is fitted.

* * * * *